US012607314B1

(12) United States Patent
Peng

(10) Patent No.: US 12,607,314 B1
(45) Date of Patent: Apr. 21, 2026

(54) POLE EXTENSION DEVICE OF MARINE NAVIGATION LIGHT

(71) Applicant: Shih-Chieh Peng, Taichung City (TW)

(72) Inventor: Shih-Chieh Peng, Taichung City (TW)

( * ) Notice: Subject to any disclaimer, the term of this patent is extended or adjusted under 35 U.S.C. 154(b) by 0 days.

(21) Appl. No.: 19/243,355

(22) Filed: Jun. 19, 2025

(51) Int. Cl.

| | |
|---|---|
| ***F21S 8/00*** | (2006.01) |
| ***B63B 45/04*** | (2006.01) |
| ***F21S 8/08*** | (2006.01) |
| ***F21V 17/12*** | (2006.01) |
| ***F21V 23/06*** | (2006.01) |
| ***F21V 31/00*** | (2006.01) |
| *F21V 21/12* | (2006.01) |

(52) U.S. Cl.
CPC .............. *F21S 8/088* (2013.01); *B63B 45/04* (2013.01); *F21V 17/12* (2013.01); *F21V 23/06* (2013.01); *F21V 31/005* (2013.01); *F21V 21/12* (2013.01)

(58) Field of Classification Search
CPC .......................... B63B 45/04; F21V 17/02–12
See application file for complete search history.

(56) References Cited

U.S. PATENT DOCUMENTS

2012/0162969 A1* 6/2012 Mallari .................... F21V 21/12 362/121
2013/0164962 A1* 6/2013 Shaw .................... H01R 13/622 439/320
2018/0231195 A1* 8/2018 Hoffman ............... F21V 17/007
2019/0191688 A1* 6/2019 LaCroix ................. A01K 97/01
2022/0299195 A1* 9/2022 Li ........................... F21V 21/22

* cited by examiner

*Primary Examiner* — Gerald J Sufleta, II
(74) *Attorney, Agent, or Firm* — LANWAY IPR SERVICES; Chun-Ming Shih

(57) ABSTRACT

A pole extension device of a marine navigation light contains: a body; a post, a holder, and a nut. The post includes a first segment and a second segment, and the second segment includes a connector and at least one electric contact. The at least one extending column includes an upper extension and a lower section, the upper extension has a threaded section and at least one electric contact. The holder includes a receiving orifice configured to accommodate the lower extension of the at least one extending column. The nut is formed on the lower extension of the at least one extending column, when the at least one extending column is accommodated in the holder, the nut is screwed with and contacts with the receiving orifice, thus connecting the holder with the at least one extending column securely and obtaining a waterproof effect.

6 Claims, 5 Drawing Sheets

POLE EXTENSION DEVICE OF MARINE NAVIGATION LIGHT

TECHNICAL FIELD

The present invention relates to a connection structure of a marine navigation light, and more particularly to a pole extension device of the marine navigation light which is capable of adjusting a height of the marine navigation light based on using requirements to obtain secure structure and waterproof effect.

BACKGROUND

Conventional navigation lights are mostly fixed poles, and the height cannot be adjusted after installation. If the lamp needs to be replaced or the position needs to be changed, the entire pole needs to be dismantled, which is not easy to maintain. Because of structural limitations, some small ships or leisure boats need to adjust the height and lighting range of the lamps according to the use environment. Therefore, there is a practical demand for the installation structure of the marine navigation with modular and extension functions.

The present invention has arisen to mitigate and/or obviate the afore-described disadvantages.

SUMMARY

The primary aspect of the present invention is to provide a pole extension device of a marine navigation light which is capable of overcoming the shortcomings of the conventional pole extension device of the marine navigation light. The threaded section of the at least one extending column is screwed and electrically conducted with the second segment of the post, thus connecting the holder with the at least one extending column securely, obtaining a waterproof effect and easy connection.

To obtain above-mentioned aspect, a pole extension device of the marine navigation light provided by the present invention provided by the present invention contains: a body, a post, at least one extending column, a holder, and a nut.

The post includes a first segment and a second segment, the first segment is connected with the body, and the second segment includes a connector and at least one electric contact which are formed on the second segment and are connected with at least one extending column.

The at least one extending column includes an upper extension and a lower section, the upper extension has a threaded section and at least one electric contact, and the threaded section of the at least one extending column is screwed and electrically conducted with the second segment of the post.

The holder includes a receiving orifice configured to accommodate the lower extension of the at least one extending column.

The nut is formed on the lower extension of the at least one extending column. When the at least one extending column is accommodated in the holder, the nut is screwed with and contacts with the receiving orifice, thus connecting the holder with the at least one extending column securely and obtaining a waterproof effect.

Also, multiple extending columns are connected based on using requirements to adjust a height of the marine navigation light. When desiring not to extend the height of the marine navigation light, the second extension of the post is received in the holder directly to eliminate a connection of the post and the at least one extending column, and the post is screwed firmly in the holder by using the nut, thus obtaining waterproof effect in high humidity and salinity marine environments.

Accordingly, the advantages of the marine navigation light are listed as follows:

1) The height of the marine navigation light is flexibly adjustable based on different heights of various boats.
2) The post is screwed with and electrically conducted with the at least one extending column, thus obtaining a quick connection and a stably electrical conductivity.
3) The multiple extending columns of the marine navigation light are increased flexibly based on the using requirements. Preferably, the structure of the marine navigation light is reinforced to avoid poor electric conductivity and removal.
4) The at least one extending column is provided based on using requirement to extend practicality.
5) The nut is screwed with the holder securely to prevent seawater and rainwater from entering the receiving orifice of the holder to enhance the waterproof effect and weather resistance.
6) The post and the at least one extending column is removable in a limited space and a small size.
7) The marine navigation light is applicable to coastal vessels, work boats, fishing boats and other devices that require in a height position.

DETAILED DESCRIPTION

Figure 1:
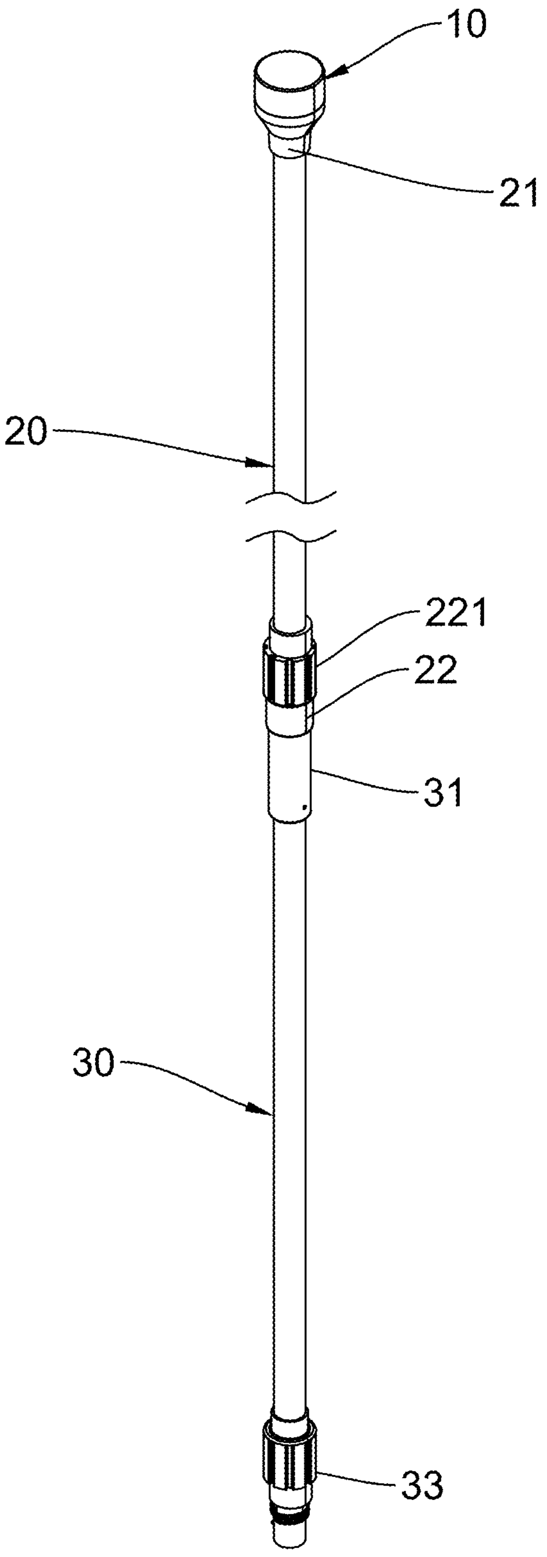
FIG. 1 is a perspective view showing the assembly of a pole extension device of a marine navigation light according to a preferred embodiment of the present invention.

With reference to FIGS. 1-5, a pole extension device of a marine navigation light according to a preferred embodiment of the present invention comprises: a lamp 10, a post 20, at least one extending column 30, and a holder 40.

Referring to FIGS. 1-5, the lamp 10 is connected on a first segment 21 of the post 20, and at least one electric contact is defined between the first segment 21 and the body 10 to conduct a power to the lamp 10.

Figure 4:
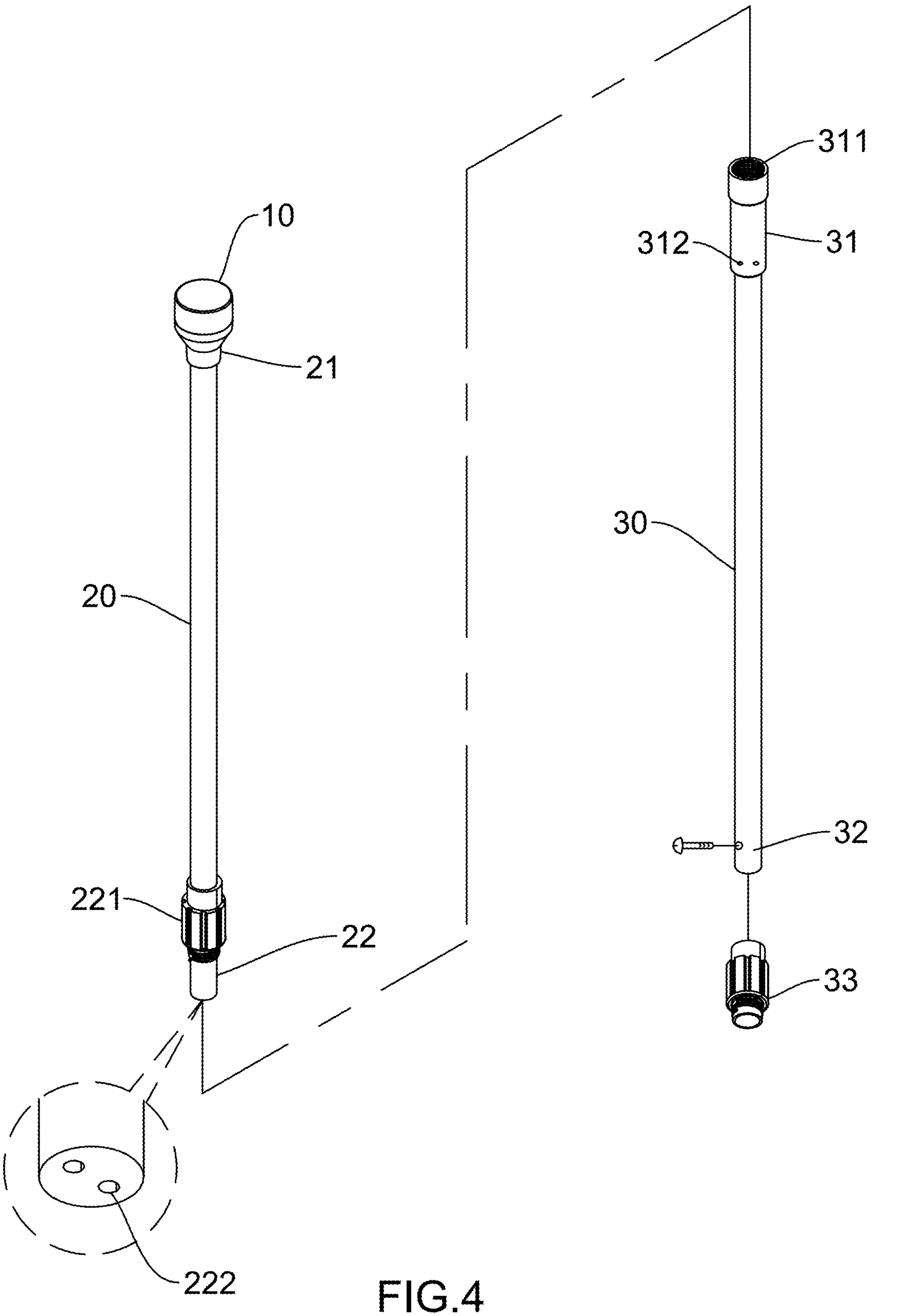
FIG. 4 is a perspective view showing the exploded components of the pole extension device of the marine navigation light according to the preferred embodiment of the present invention.
Figure 5:
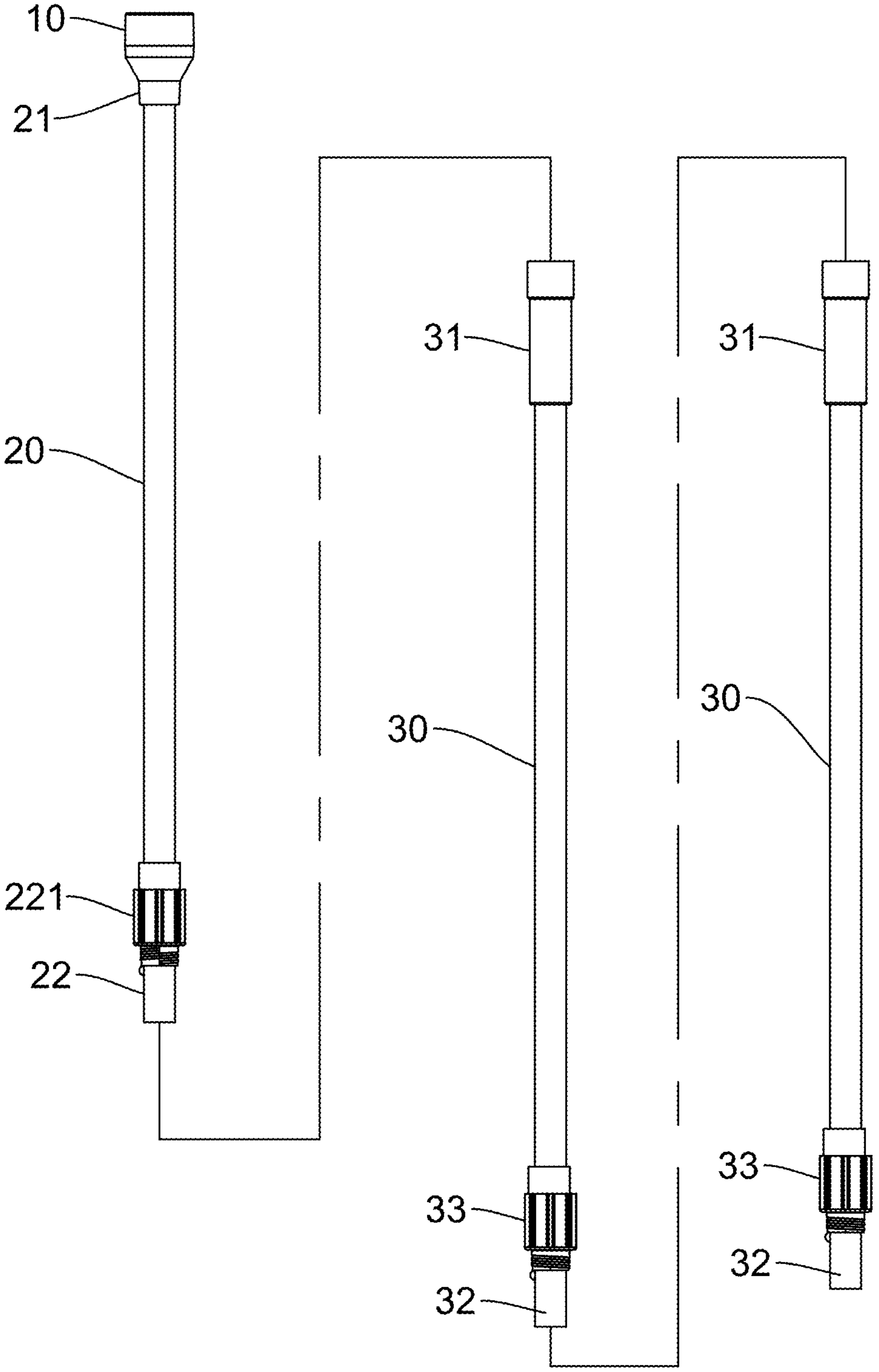
FIG. 5 is a perspective view showing the application of the pole extension device of the marine navigation light according to the preferred embodiment of the present invention.

As shown in FIGS. 4 and 5, the post 20 includes a second segment 22 on which a connector 221 and the at least one electric contact 222 are formed and connected with an upper extension 31 of the at least one extending column 30.

As illustrated in FIGS. 1, 4 and 5, the at least one extending column 30 is connected with the second segment 22 of the post 20, and the at least one extending column 30 includes the upper extension 31 and a lower section 32, wherein the upper extension 31 has a threaded section 311 and at least one electric contact 312, and the threaded section 311 of the at least one extending column 30 is screwed and electrically conducted with the second segment of the post 20.

Figure 2:
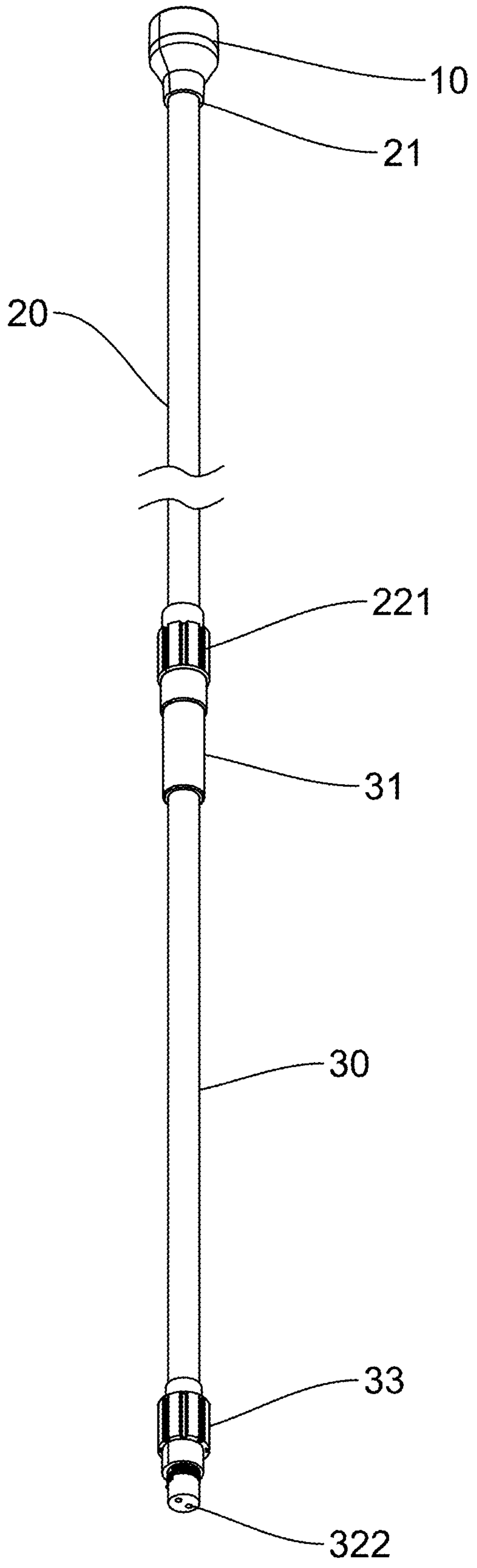
FIG. 2 is another perspective view showing the assembly of the pole extension device of the marine navigation light and the electric contacts according to the preferred embodiment of the present invention.
Figure 3:
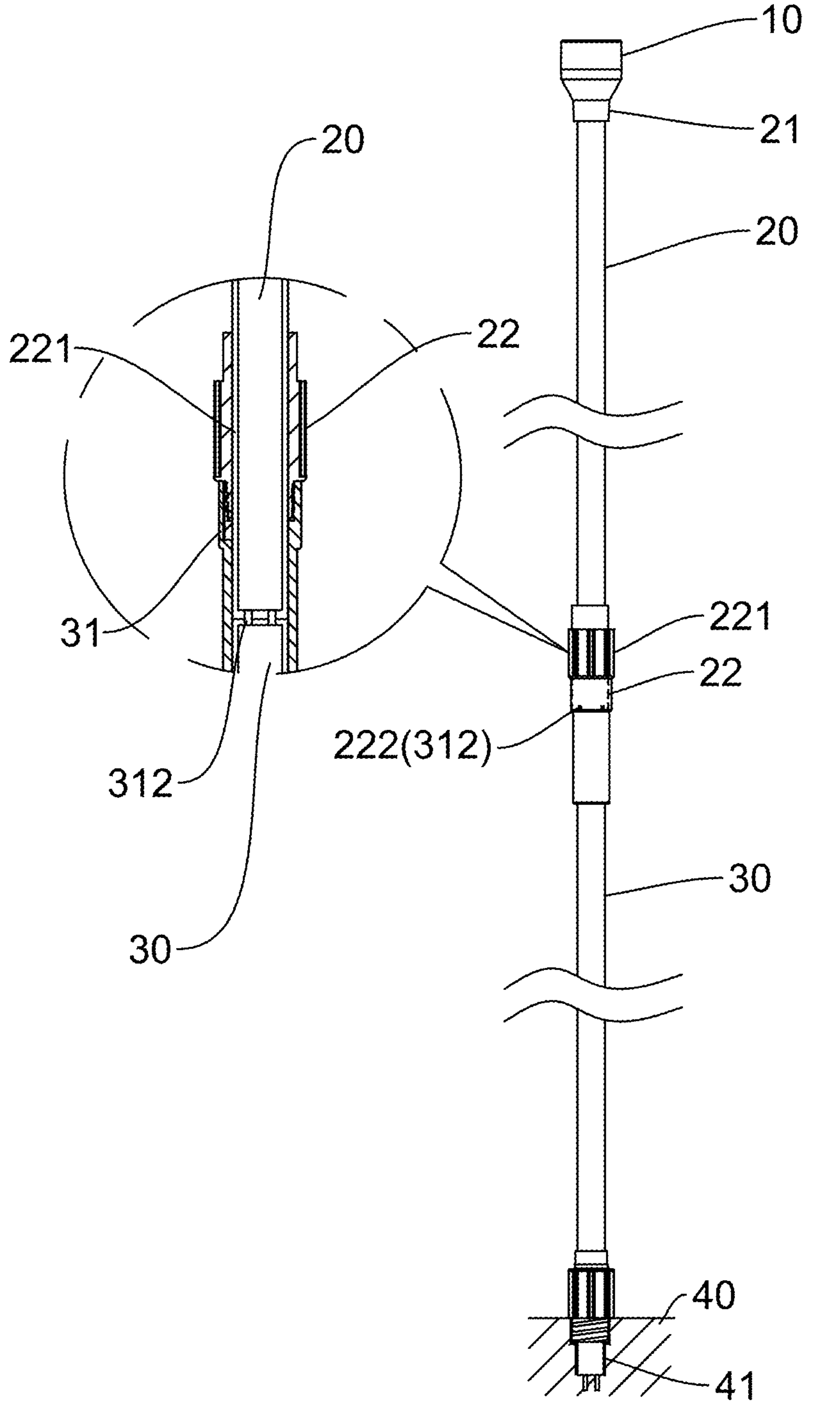
FIG. 3 is a cross sectional view showing the assembly of the pole extension device of the marine navigation light according to the preferred embodiment of the present invention.

With reference to FIGS. 2 and 3, the lower extension 32 of the at least one extending column 30 has a nut 33, when the at least one extending column 30 is received in the holder 40, the nut 33 is rotated to contact with a receiving orifice 41, thus connecting the holder 40 with the at least one extending column 30 securely and obtaining a waterproof effect. The lower extension 32 of the at least one extending column 30 has at least one electric contact 322 to electrically conduct with the holder 40. The at least one extending column 30 is received in the holder 40 and is connected by using the nut 33. The receiving orifice 41 has at least one electric contact to electrically conduct with the at least one electric contact 322 of the at least one extending column 30.

FIG. 4 is a perspective view showing the exploded components of the pole extension device of the marine navigation light to illustrate the lamp 10, the post 20, the at least one extending column 30, and the holder 40.

FIG. 5 is a perspective view showing the application of the pole extension device of the marine navigation light according to the preferred embayment of the present invention, wherein multiple extending columns 30 are connected, the upper extension 31 of each extending column 30 has the threaded section 311 and the at least one electric contact 312 to connect with the second segment 32 of another extending column 30 or the connector 221, thus connecting the multiple extending columns 30 based on using requirements.

Accordingly, the pole extension device of the marine navigation light has advantages described as follows.

1) Referring to FIGS. 1-4, the second extension 22 of the post 20 is screwed with the at least one extending column 30, and the at least one extending column 30 is received in the holder 40 and is fixed by using the nut 33, hence a height of the marine navigation light is higher than a boat and is connected easily and firmly.
2) As shown in FIG. 5, the second extension 22 of the post 20 is screwed with the at least one extending column 30, and the upper extension 31 of each of the at least one extending column 30 has the threaded section 311 and the at least one electric contact 312, thus connecting the at least one extending column together based on the using requirements.
3) When desiring not to extend the height of the marine navigation light, the second extension 22 of the post 20 is received in the holder 40 directly to eliminate a connection of the post 20 and the at least one extending column 30, and the post 20 is screwed firmly in the holder 40 by using the nut 33. Thereby, the height of the marine navigation light is applicable for a lower height or a limited space to decrease a quantity of related components.
4) The multiple extending columns 30 of the marine navigation light are increased flexibly based on the using requirements.
5) The post 20 is screwed with and electrically conducted with the at least one extending column 30, thus obtaining a quick connection and a stably electrical conductivity.
6) The at least one extending column 30 is received in the holder 40 and is connected by using the nut 33, thus connecting the holder 40 with the at least one extending column 30 securely and obtaining the waterproof effect.
7) The multiple extending columns 30 are connected to be applicable for a higher boat, thus avoiding a replacement of the marine navigation light.
8) The post 20 is received in the holder 40 directly to eliminate a connection of the post 20 and the at least one extending column 30, thus simplifying the marine navigation light.
9) All components of the marine navigation light are replaceable and manufactured in a massive quantity to reduce maintenance and inventory costs. Preferably, the marine navigation light is removable and replaceable quickly and has stably electrical contact and excellent waterproof effect.
10) After removing the post 20 and the at least one extending column 30, they are accommodated in a small size.

While the first embodiments of the invention have been set forth for the purpose of disclosure, modifications of the disclosed embodiments of the invention as well as other embodiments thereof may occur to those skilled in the art. The scope of the claims should not be limited by the first embodiments set forth in the examples, but should be given the broadest interpretation consistent with the description as a whole.

What is claimed is:

1. A pole extension device of a marine navigation light comprising:

a body;

a post including a first segment and a second segment, the first segment being connected with the body, and the second segment including a connector and at least one electric contact which are formed on the second segment and are connected with at least one extending column;

the at least one extending column including an upper extension and a lower section, the upper extension having a threaded section and at least one electric contact, and the threaded section of the at least one extending column being screwed and electrically conducted with the second segment of the post;

a holder including a receiving orifice configured to accommodate the lower extension of the at least one extending column;

a nut formed on the lower extension of the at least one extending column, when the at least one extending column is accommodated in the holder, the nut is screwed with and contacts with the receiving orifice, thus connecting the holder with the at least one extending column securely and obtaining a waterproof effect;

wherein a height of the marine navigation light is adjustable by screwing the post with the at least one extending column, the at least one extending column is electrically conducted with the post, and the holder is electrically conducted with the at least one extending column.

2. The pole extension device of the marine navigation light as claimed in claim 1, wherein the lower extension of the at least one extending column has at least one electric contact to electrically conduct with the holder.

3. The pole extension device of the marine navigation light as claimed in claim 1, wherein the at least one extending column is a plurality of extending columns.

4. The pole extension device of the marine navigation light as claimed in claim 3, wherein the upper extension of each of the plurality of extending columns is screwed with and electrically conducted with the second segment of another one of the plurality of extending columns or the connector.

5. The pole extension device of the marine navigation light as claimed in claim 1, wherein the connector is removable and is screwed with the second segment of the post.

6. The pole extension device of the marine navigation light as claimed in claim 1, wherein the nut is rotated to contact with the receiving orifice, thus obtaining a further waterproof effect.

* * * * *